US009998450B2

(12) United States Patent
Tejerina et al.

(10) Patent No.: US 9,998,450 B2
(45) Date of Patent: Jun. 12, 2018

(54) AUTOMATICALLY GENERATING CERTIFICATION DOCUMENTS (71) Applicant: MICROSOFT TECHNOLOGY LICENSING, LLC, Redmond, WA (US)

(72) Inventors: David Nunez Tejerina, Bellevue, WA (US); Steven Bowles, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 460 days.

(21) Appl. No.: 14/820,465

(22) Filed: Aug. 6, 2015

(65) Prior Publication Data
US 2015/0339286 A1  Nov. 26, 2015

Related U.S. Application Data (63) Continuation of application No. 14/017,088, filed on Sep. 3, 2013, now Pat. No. 9,137,237.

(51) Int. Cl.
*H04L 29/06* (2006.01)
*G06F 17/21* (2006.01)
(Continued)

(52) U.S. Cl.
CPC ........ *H04L 63/0823* (2013.01); *G06F 17/212* (2013.01); *G06F 17/248* (2013.01);
(Continued)

(58) Field of Classification Search
CPC ... H04L 63/0823; H04L 63/20; H04L 9/3268; G06F 17/212; G06F 17/248; G06F 21/577
See application file for complete search history.

(56) References Cited

U.S. PATENT DOCUMENTS 5,692,206 A    11/1997 Shirley et al.
7,240,213 B1 *  7/2007 Ritter ................... G06Q 40/00
                                                    380/246
(Continued)

FOREIGN PATENT DOCUMENTS

CN    1756193 A    4/2006
CN    101313298 A   11/2008
(Continued)

OTHER PUBLICATIONS

"Final Office Action Issued in U.S. Appl. No. 14/037,368", dated Mar. 2, 2016, 36 Pages.
(Continued)

*Primary Examiner* — Darren B Schwartz
(74) *Attorney, Agent, or Firm* — Turk IP Law, LLC (57) ABSTRACT A certification application automatically generates a certification document associated with a service. A transformation module retrieves a component information associated with a status of a service from a data store maintaining the component information. The component security data and component metadata is included within the component information. The component information is transformed for insertion into a certification information. Risk analysis, phraseology, and localization data is used to transform the component information. The certification document is generated based on the certification template by inserting the component information into the certification template.

20 Claims, 6 Drawing Sheets

(51) Int. Cl.
  *G06F 17/24* (2006.01)
  *H04L 9/32* (2006.01)
  *G06F 21/57* (2013.01)

(52) U.S. Cl.
  CPC .......... *G06F 21/577* (2013.01); *H04L 9/3268* (2013.01); *H04L 63/20* (2013.01)

(56) References Cited

U.S. PATENT DOCUMENTS

| | | | |
|---|---|---|---|
| 7,437,764 | B1 | 10/2008 | Sobel et al. |
| 7,475,151 | B2 | 1/2009 | Delany et al. |
| 7,527,195 | B2 | 5/2009 | Keithley et al. |
| 7,543,228 | B2 | 6/2009 | Kelkar et al. |
| 7,694,191 | B1 | 4/2010 | Bono et al. |
| 7,747,938 | B2 | 6/2010 | Elkady |
| 7,757,167 | B2 | 7/2010 | Kobashi et al. |
| 7,870,485 | B2 | 1/2011 | Seliutin et al. |
| 8,037,101 | B1 | 10/2011 | Bargas et al. |
| 8,234,570 | B2 | 7/2012 | Ananthanarayanan et al. |
| 8,271,949 | B2 | 9/2012 | Bernardini et al. |
| 8,707,385 | B2 | 4/2014 | Jain et al. |
| 2002/0042687 | A1 | 4/2002 | Tracy et al. |
| 2002/0199122 | A1* | 12/2002 | Davis ............... G06F 21/577 726/25 |
| 2004/0006704 | A1 | 1/2004 | Dahlstrom et al. |
| 2004/0102923 | A1 | 5/2004 | Tracy et al. |
| 2004/0250062 | A1 | 12/2004 | Douglas |
| 2005/0010819 | A1 | 1/2005 | Williams et al. |
| 2005/0091067 | A1 | 4/2005 | Johnson |
| 2005/0228688 | A1 | 10/2005 | Visser et al. |
| 2005/0257267 | A1 | 11/2005 | Williams et al. |
| 2006/0004814 | A1* | 1/2006 | Lawrence ............ G06Q 40/08 |
| 2006/0010049 | A1 | 1/2006 | Sunde |
| 2006/0015934 | A1* | 1/2006 | Wool .................. H04L 63/02 726/11 |
| 2006/0021054 | A1* | 1/2006 | Costa ............... G06F 21/566 726/25 |
| 2006/0059026 | A1 | 3/2006 | King et al. |
| 2006/0075219 | A1 | 4/2006 | Callaghan et al. |
| 2006/0090206 | A1 | 4/2006 | Ladner et al. |
| 2006/0101517 | A1 | 5/2006 | Banzhof et al. |
| 2006/0233114 | A1 | 10/2006 | Alam et al. |
| 2007/0101432 | A1 | 5/2007 | Carpenter |
| 2007/0124797 | A1 | 5/2007 | Gupta et al. |
| 2008/0177799 | A1 | 7/2008 | Wilson |
| 2008/0183459 | A1 | 7/2008 | Simonsen et al. |
| 2008/0189788 | A1 | 8/2008 | Bahl |
| 2008/0270316 | A1 | 10/2008 | Guidotti et al. |
| 2009/0007264 | A1 | 1/2009 | Chatterjee et al. |
| 2009/0187963 | A1 | 7/2009 | Bori |
| 2009/0205011 | A1 | 8/2009 | Jain et al. |
| 2009/0205012 | A1 | 8/2009 | Jain et al. |
| 2009/0276695 | A1 | 11/2009 | Hodges et al. |
| 2010/0223541 | A1 | 9/2010 | Clee et al. |
| 2010/0293617 | A1* | 11/2010 | Wool .................. H04L 41/0873 726/25 |
| 2011/0112974 | A1 | 5/2011 | Hinton et al. |
| 2011/0179477 | A1 | 7/2011 | Starnes et al. |
| 2011/0212717 | A1 | 9/2011 | Rhoads et al. |
| 2011/0264438 | A1 | 10/2011 | Chiu et al. |
| 2012/0117608 | A1 | 5/2012 | Metke et al. |
| 2013/0055394 | A1 | 2/2013 | Beresnevichiene et al. |
| 2013/0067581 | A1 | 3/2013 | Venketeshwar |
| 2013/0073704 | A1 | 3/2013 | Whitlock et al. |
| 2013/0198799 | A1 | 8/2013 | Staggs et al. |
| 2013/0198848 | A1 | 8/2013 | Wolff |
| 2013/0205364 | A1 | 8/2013 | Kiehtreiber et al. |
| 2013/0227636 | A1 | 8/2013 | Bettini et al. |
| 2013/0298192 | A1* | 11/2013 | Kumar ............... G06F 21/52 726/3 |
| 2013/0298244 | A1 | 11/2013 | Kumar et al. |
| 2014/0109176 | A1 | 4/2014 | Barton et al. |
| 2014/0195445 | A1 | 7/2014 | Abuelsaad et al. |
| 2014/0337528 | A1 | 11/2014 | Barton et al. |
| 2014/0351939 | A1 | 11/2014 | Moore et al. |

FOREIGN PATENT DOCUMENTS

| | | |
|---|---|---|
| CN | 102281300 A | 12/2011 |
| CN | 102792632 A | 11/2012 |
| JP | 2005322123 A | 11/2005 |
| RU | 2011133815 A | 5/2013 |
| RU | 2494455 C2 | 9/2013 |
| WO | 2002015032 A2 | 2/2002 |

OTHER PUBLICATIONS

"First Office Action Issued in Chinese Patent Application No. 201480048624.9", dated Nov. 16, 2017, 14 Pages.

"Office Action Issued in Chile Patent Application No. 480-2016", dated Nov. 29, 2017, 7 Pages.

"International Preliminary Report on Patentability Issued in PCT Application No. PCT/US2014/056706", dated Dec. 11, 2015, 7 Pages.

"Office Action Issued in Colombian Application No. 1652279", dated Mar. 31, 2016, 4 Pages. (w/o English Translation).

"International Preliminary Report on Patentability Issued in PCT Application No. PCT/US2014/053317", dated Dec. 10, 2015, 7 Pages.

Office Action received for U.S. Appl. No. 14/035,760, dated May 27, 2015 and filed on Sep. 24, 2013.

Notice of Allowance received for U.S. Appl. No. 14/017,088, dated May 13, 2015 and filed on Sep. 3, 2013.

"International Search Report and Written Opinion Issued in PCT Application No. PCT/US2014/056706", dated Feb. 2, 2015, 11 Pages.

King, et al., "Towards Self-Testing in Autonomic Computing Systems", In Eighth International Symposium on Autonomous Decentralized Systems, Mar. 21, 2007, 8 pages.

Ghosh, et al., "Self-healing Systems—Survey and Synthesis", In Journal of Decision Support Systems, vol. 42, Issue 4, Aug. 17, 2006, 22 pages.

Jiang, et al., "A Modeling Framework for Self-Healing Software Systems", In Workshop "Models@ Run. Time" at the 10th International Conference on Model Driven Engineering Languages and Systems, Sep. 2007, 9 pages.

Saha, Goutam Kumar, "Software—Implemented Self-healing System", In CLEI Electronic Journal, vol. 10, Issue 2, Paper 5, Dec. 2007, 6 pages.

Gorla, et al., "Achieving Cost-Effective Software Reliability through Self-Healing", In Journal of Computing and Informatics, vol. 2, Feb. 2010, 22 pages.

Keromytis, Angelos D., "The Case for Self-Healing Software", Published on: Aug. 24, 2007, Available at: http://www.cs.columbia.edu/-angelos/Papers/2007/self-heal.pdf.

Office Action received for U.S. Appl. No. 14/037,368, dated Jan. 5, 2015 and filed on Sep. 26, 2013.

"International Search Report and Written Opinion issued for PCT Application No. PCT/US2014/053317", dated Nov. 21, 2014, 9 Pages.

"E-Document Shift", Published on: Sep. 8, 2011, Available at: http://www.intelledox.com/Products/Business—Needs/eDocument-Shift.aspx.

"Symantec™ Control Compliance Suite", Published on: Sep. 16, 2008, Available at: http://eval.symantec.com/mktg info/enterprise/fact_s heets/b-datasheet_ control_ compliance_s uite_ 9.0-06 11_2008.en-us.pdf.

Kharbili, et al., "Towards a Framework for Semantic Business Process Compliance Management", In Proceedings of the Workshop on Governance, Risk and Compliance for Information Systems, Jun. 17, 2008, 15 pages.

"IT Governance, Risk Management and Compliance", Retrieved on: Jul. 30, 2013, Available at: http://www.tecnocomputacion.com/images/pdf/modulo-riskmanager-overview.pdf.

"Compliance Auditor Software Features", Retrieved on: Jul. 30, 2013, Available at: http://www.avatie r. com/products/identity-man-age me nU a ccess-governa nee/comp l ia nce-aud ito r/featu res/.

(56) References Cited

OTHER PUBLICATIONS

"International Search Report and Written Opinion Issued in PCT Patent Application No. PCT/US2014/056425", dated Dec. 3, 2014, 7 Pages.

"Second Written Opinion Issued in PCT Application No. PCT/US2014/053317", dated Sep. 10, 2015, 7 Pages.

"Non-Final Office Action Issued in U.S. Appl. No. 14/017,088", dated Feb. 3, 2015, 21 Pages.

"Final Office Action Issued in U.S. Appl. No. 14/037,368", dated Sep. 1, 2015, 34 Pages.

"Final Office Action Issued in U.S. Appl. No. 14/037,368", dated Jun. 12, 2015, 36 Pages.

"International Preliminary Report on Patentability Issued in PCT Patent Application No. PCT/US2014/053317", dated Dec. 10, 2015, 8 Pages.

"International Preliminary Report on Patentability Issued in PCT Application No. PCT/US2014/056425", dated Dec. 23, 2015, 6 Pages.

"Second Written Opinion Issued in PCT Application No. PCT/US2014/056425", dated Sep. 8, 2015, 5 Pages.

"Second Written Opinion Issued in PCT Application No. PCT/US2014/056706", dated Sep. 16, 2015, 6 Pages.

"Office Action Issued in Japanese Patent Application No. 2016-540289", dated Jan. 18, 2018, 7 Pages.

"Office Action Issued in Colombian Patent Application No. 201480066425.0", dated Jan. 16, 2018, 11 Pages. (W/o English Translation).

"Office Action Issued in Russian Patent Application No. 2016107545", dated Mar. 21, 2018, 6 Pages. (W/o English Translation).

* cited by examiner

AUTOMATICALLY GENERATING CERTIFICATION DOCUMENTS

CROSS-REFERENCE TO RELATED APPLICATION

This application is a continuation filing under 35 U.S.C. § 120 of co-pending U.S. patent application Ser. No. 14/017,088 filed on Sep. 3, 2013, by the same inventors, commonly assigned herewith. The disclosure of the U.S. patent application is hereby incorporated by reference in its entirety.

BACKGROUND

The proliferation of computerized automation of processes in every aspect of life, data storage and processing have become a major component of networked systems handling financial and other transactions. In such systems, data is entered, modified, or deleted from a number of sources. The same data is maintained in multiple data stores in same or different formats, and a data store has to pick up or synchronize changes to data based on changes in a different store. Various data stores from simple tables to complicated databases is maintained and synchronized as new entries or modifications are made by different sources. The changes are synchronized at regular intervals. In addition, variety of services are offered to enable internal and external parties' interactivity with the data hosted by the data stores. Consumers of the data as well as providers usually demand certifications associated with the services to enable compliance-associated processes between the parties.

Compliance certifications demand complex documents. The complexity of the documents rarely comply with strict templates used to generate legacy certification documents. Components for certifications of a service frequently need to be reported at differing levels of detail. Variations in detail force compliance systems to maintain a large number of documents. The documents usually host similar content, but aggregated differently, at differing levels of detail and with changes to terminology.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automated generation of certification documents. A certification application may retrieve a component information associated with a status of a service from a data store maintaining the component information. The component information may include component security information and component metadata. The component information may be transformed for insertion into a certification template. Risk analysis data, phraseology data, and localization data may be used to transform the component information. In addition, a certification document may be generated based on the certification template by inserting the component information into the certification template.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a certification document may be automatically generated based on component information associated with a status of a service. certification application may retrieve and transform the component information from a data store. The certification document may be generated based on the certification template by inserting the component information into the certification template.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined b the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to generate automatically a certification document. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network, More detail on these technologies and example embodiments may be found in the following description.

Figure 1:
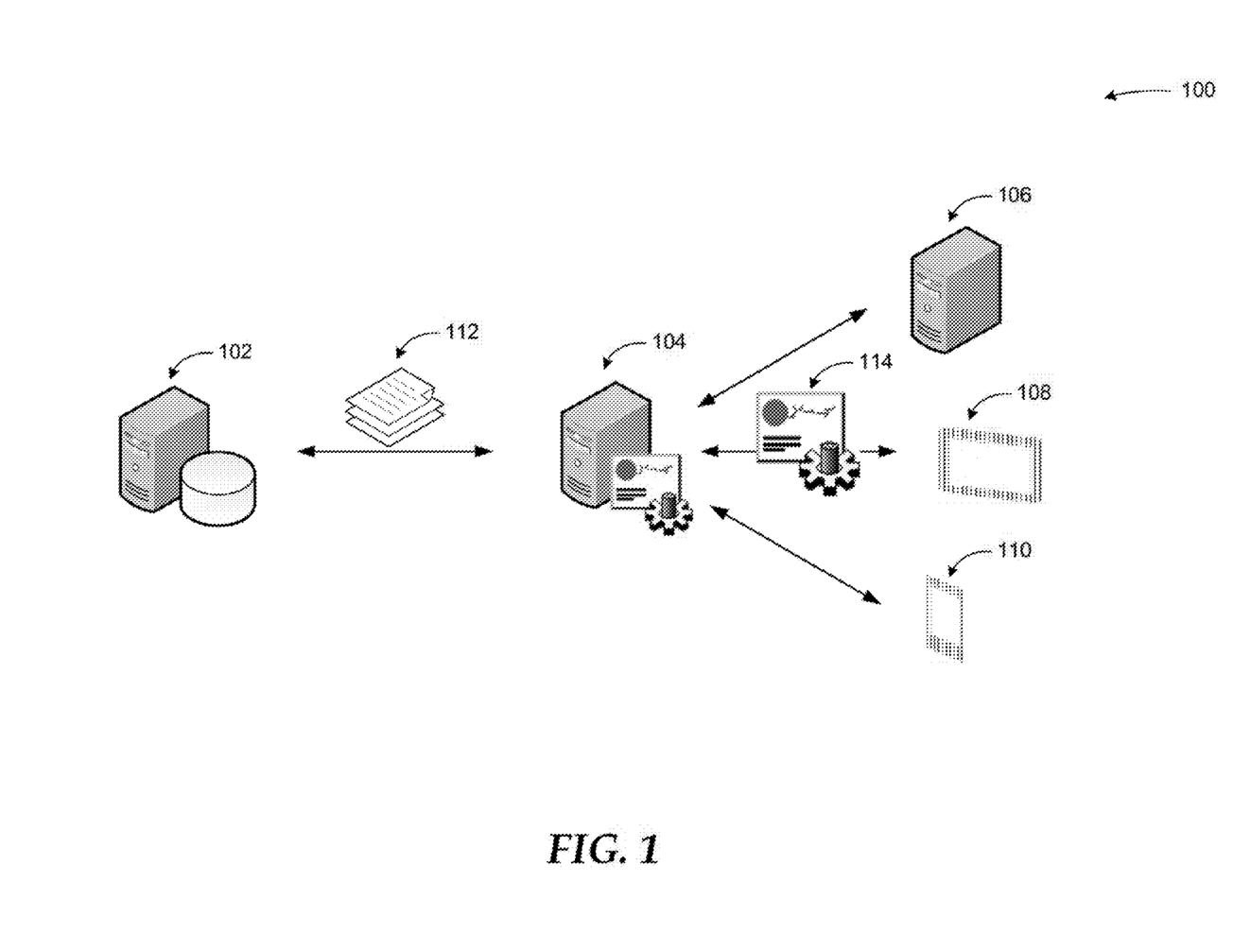
FIG. 1 is a conceptual diagram illustrating an example to generate automatically a certification document based on component information associated with a status of a service, according to embodiments.

FIG. 1 includes diagram 100 illustrating a conceptual diagram to generate automatically a certification document based on component information associated with a status of a service, according to embodiments.

A certification application may generate certification documents associated with components of a service. A server 102 may provide services. A service may include variety of applications including web services, reporting services, financial services, and similar ones. Consumers may demand compliance certification documents associated with provided services such as storage policy certification, security policy certification, and similar ones. As such, a scheme may be in demand to provide certification documents associated with the services of server 102.

A server 104 executing a certification application may generate a certification document 114 associated with a component of a service provided by server 102. The certification application may generate the certification document 114 associated with the component. Component information 112 retrieved from the server 102 may provide data associated with the service. The component information 112 may be processed and inserted into a template to generate the certification document 114. Alternatively, the certification application may also generate a certification document 114 associated with a network infrastructure or a personnel associated with a service.

The certification document 114 may be transmitted to client devices 106, 108, and 110 consuming the service from server 102. The certification document 114 may also be printed into a hard copy such as a paper printout, an identification card, and similar ones. The certification document 114 may be used to validate the service associated with the certification document 114 or establish a trust based communication between the service and a consumer. A certification document 114 may be generated for each service offered by the server 102. The client devices 106, 108, and 110 may include a server, a desktop computer, a tablet computer, a notebook computer, a smartphone, and similar ones.

While the example system in FIG. 1 has been described with specific components including a server 102 providing services and a server 104 providing certification documents associated with the services, embodiments are not limited to these components or system configurations and can be implemented with other system configuration employing fewer or additional components. In an alternate example, component information 112 associated with a service of the server 102 may be stored in a data store in server 104. The data store may be updated to reflect changes to the service. Furthermore, embodiments are not limited to compliance, validation, and trust based schemes. The approaches discussed here may be applied to any certification process for any services provided by an application and/or a server using the principles described herein.

Figure 2:
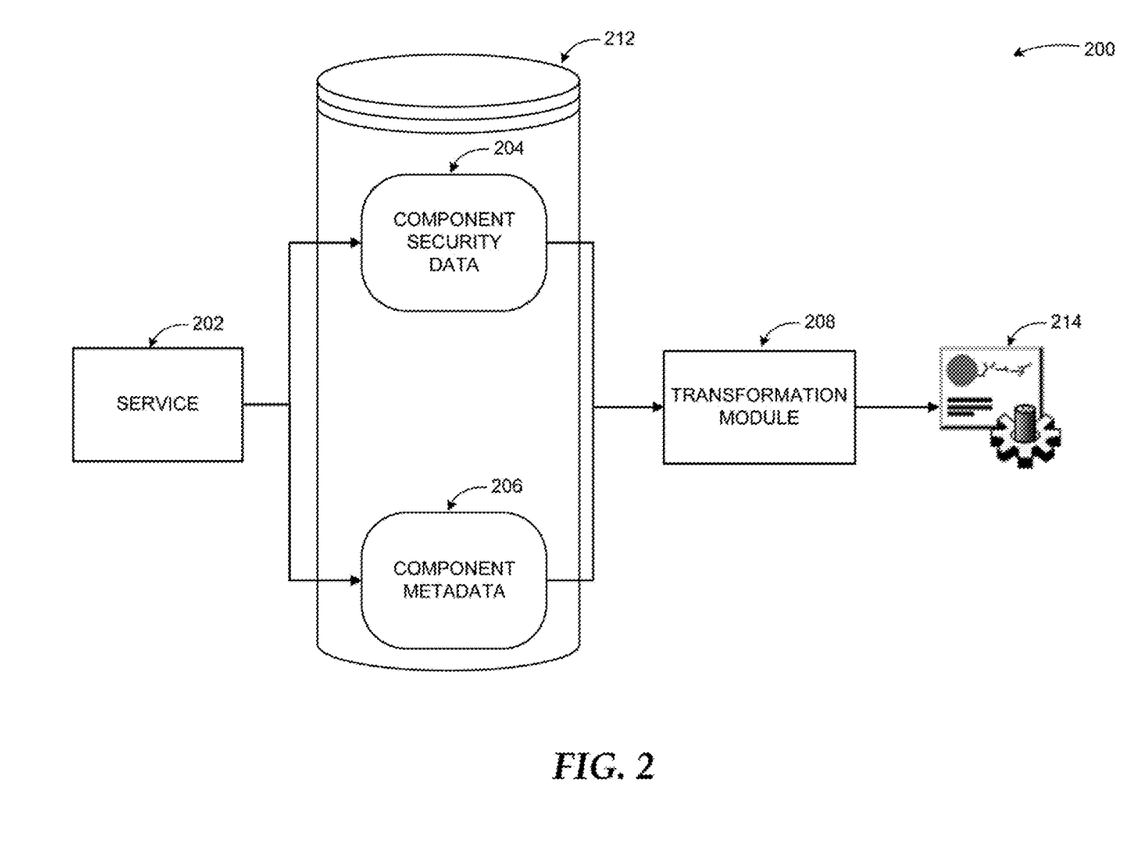
FIG. 2 is a component diagram of a scheme to generate automatically a certification document, according to embodiments.

FIG. 2 is a component diagram of a scheme to generate automatically a certification document. Diagram 200 illustrates an example certification application generating a certification document 214 from component information associated with a service 202.

A data store 212 associated with the certification application may store component information associated with the service 202. The component information may include information associated with components of the service 202 reflecting a status of the service 202. The component information may include component security data 204 and component metadata 206. The component metadata 206 may include descriptive information about the service including a name, a description, input parameters, output parameters, and similar ones. The component security data 204 may include security implementation information associated with security rules executed by the service. The service 202 may have multiple components and each component may have component security data 204 and component metadata 206 associated with the service 202.

The data store 212 may be subscribed to the service to update the component security data 204 and component metadata 206 in response to changes associated with the service. In an example scenario, if the service 202 updates its encryption method the data store may receive component information associated with the update and store the component information in the component security data 204. In another example scenario, if the service 202 changes its name, the data store may receive a component information from the service 202 and update the component metadata 206 to reflect the change. Alternatively, the certification application may periodically query the service 202 to retrieve changes to the service 202 and submit the changes to the data store to update the component metadata 206 and the component security data 204. Update frequency may be on a predetermined schedule an automatically adjusted schedule, and an event based action to meet service and certification application parameters and limitations (e.g. available network bandwidth). The event based action may be determined based on a push scenario where execution or detection of a change may generate an event to induce the certification application to submit the change to the data store to update the component metadata 206 and the component security data 204.

The transformation module 208 may retrieve the component information from data store 212. The transformation module 208 may process the component information to insert the component information into a certification template. The transformation module 208 may select a certification template from multiple available templates based on matching attributes between the component information and the selected certification template. In an example scenario, the transformation template may select a we certification template in response to detecting web services related information within the component metadata 206 of the component information associated with the service 202. The processed component information may be inserted into the selected certification template to generate the certification document 214. The certification document 214 may be transmitted to a risk analysis entity and/or a consumer of the service 202 to provide compliance information associated with the service to the consumer. The certification document 214 may be used to establish a trusted subscription, encrypted communications, and similar ones between the consumer and the service 202.

Figure 3:
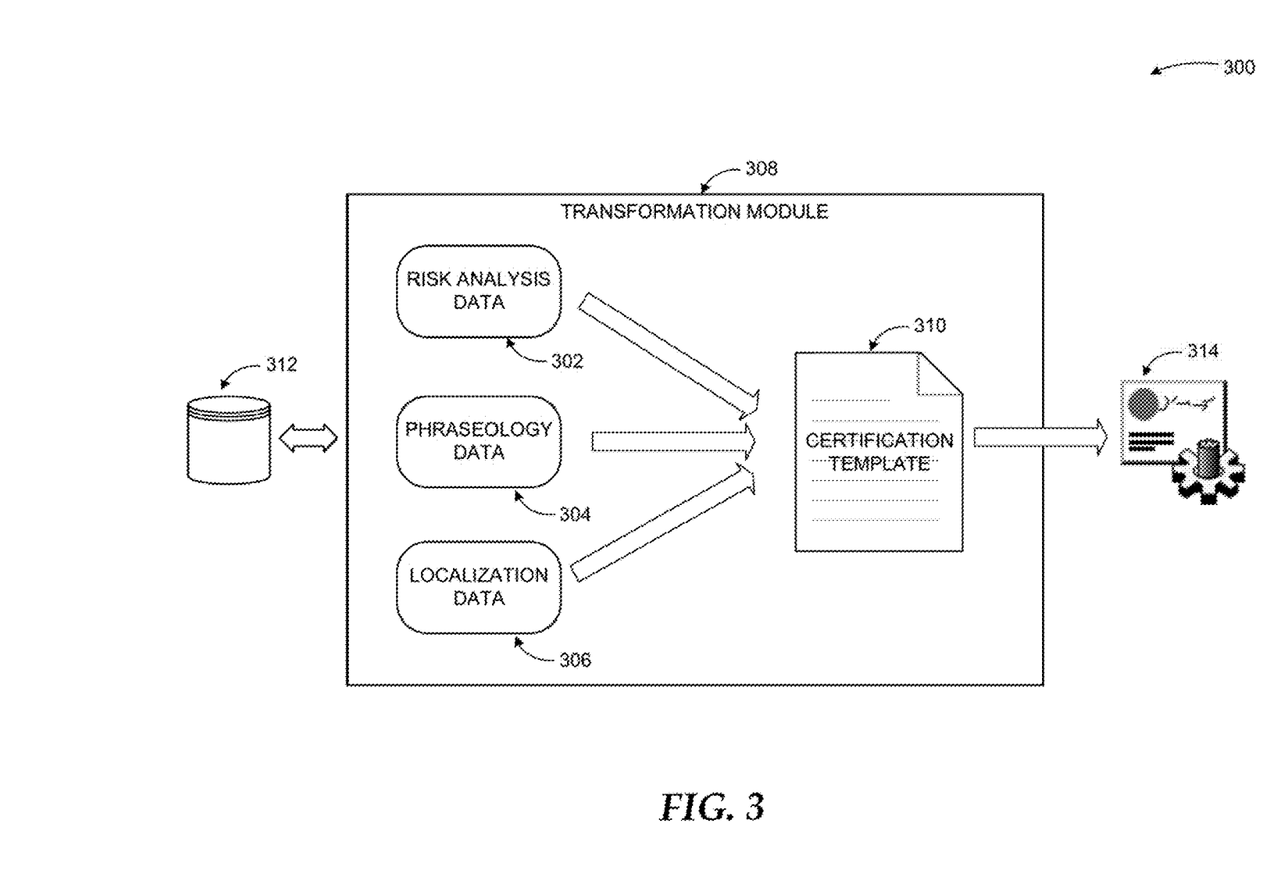
FIG. 3 is an example of a transformation module automatically generating a certification document, according to embodiments.

FIG. 3 is an example of a transformation module automatically generating a certification document, according to embodiments.

As shown in the diagram 300, a transformation module 308 may retrieve component information from data store 312 to generate a certification document 314 based on the component information. The component information may reflect a present status of a service. The transformation module 308 may compare risk, analysis data 302 to the component information to verify a status of the service. The risk analysis data 302 may include a subset of component information retrieved externally to verify data associated with the service. The risk analysis data 302 may be determined from any source that estimates a risk to the security of the service such as audits, third party reviews, automated testing, and similar ones. In addition, the transformation module 308 may query the service directly or query a risk analysis provider to retrieve the risk analysis data 302. The risk analysis data 302 may include top level metadata associated with the service. The top level metadata may include component identifiers and status associated with the service.

The transformation module may validate the component information with the risk analysis data 302. In response to determining a discrepancy, the component information may be updated with the risk analysis data 302 and the component information may be transmitted back to the data store 312 for storage. The risk analysis data 302 may also be used to change a level of detail of the component information to be inserted into the certification template 310. Level of detail may be determined based on attributes of the top level metadata stored in the risk analysis data 302. Number of footnotes in the certification document may also be determined based on the risk analysis data 302. In addition, the transformation module may also determine a placement of a portion of content of the component information within a body of the certification document 314 and another portion of the content in appendices of the certification document 314 based on the risk analysis data 302.

In addition, the transformation module 308 may utilize phraseology data 304 to transform the component information to parameters associated with a language sorting of a consumer. The phraseology data 304 may be used to translate the component information to a coherent sentence structure of the language parameter associated with the consumer. The translated component information may be inserted into the certification template 310 associated with the language parameter of the consumer. Furthermore, the certification template 310 may be selected based on the language parameter of the consumer to provide a translated certification document 314.

Moreover, the phraseology data 304 may be used to process the component information to a technical detail to match a technical detail setting provided by the consumer. The technical detail may also be associated with the certification template. The phraseology data 304 may be used to transform the component information to a technical detail to match a technical detail setting of the certification template 310. In an example scenario, the transformation module 308 may transform the component information to a graph to present a status of the service in a visual format. Furthermore, the phraseology data 304 may be retrieved from a local resource or from a trusted external resource providing phraseology services associated with the consumer of the service.

According to some embodiments, localization data 306 may be used to translate the component information to match a localization setting of the consumer. The localization data may be retrieved from a local resource or a trusted external resource. The localization setting may be determined based on a location of the consumer. Alternatively, the localization setting may be a consumer provided setting.

The localization data 306 may include metric parameters to convert metrics and measurements within the component information to match the localization setting of the consumer. The converted metrics and measurements may be inserted into the certification template 310 to generate the certification document 314. The certification document 314 may be formatted based on a headnote parameter, a footnote parameter, and/or an appendix parameter retrieved from the localization data matching the localization setting of the consumer.

The example scenarios and schemas in FIGS. 2 and 3 are shown with specific components, data types, and configurations. Embodiments are not limited to systems according to these example configurations. Automatically generating a certification document associated with a status of a service may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
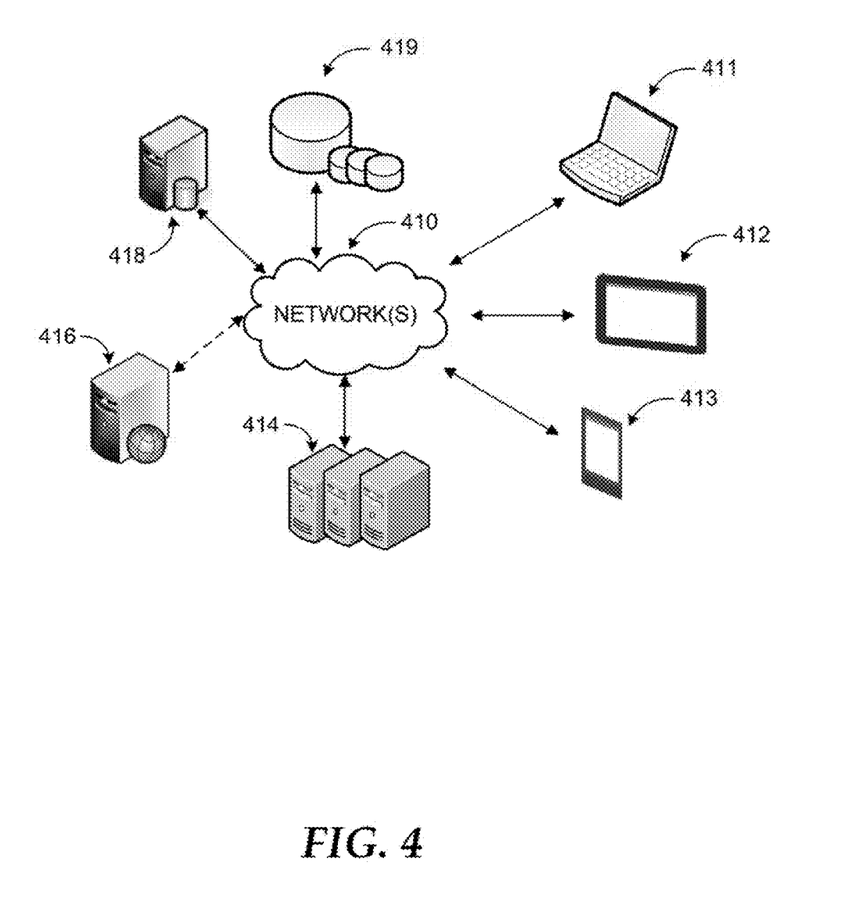
FIG. 4 is a simplified networked environment, where a system according to embodiments may be implemented.

FIG. 4 is an example networked environment, where embodiments may be implemented. A system automatically generating a certification document may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. A certification application may automatically generate certification documents for the client devices 411-413. The certification application may retrieve a component information associated with a status of a service from a data store maintaining the component information. The component information may be transformed and inserted into a certification template to generate a certification document associated with the service. The certification application may store the updates or additional data associated with the component information in data store(s) 419 directly or through database server 418.

Network(s) 410 may comprise any topology of servers, clients, Internet service providers, and communication media. A system according to embodiments may have a static or dynamic topology. Network(s) 410 may include secure networks sub as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to generate automatically a certification document. Furthermore, the networked environments discussed in FIG. 4 are for illustration purposes only. Embodiments are not limited to the example applications, modules, or processes.

Figure 5:
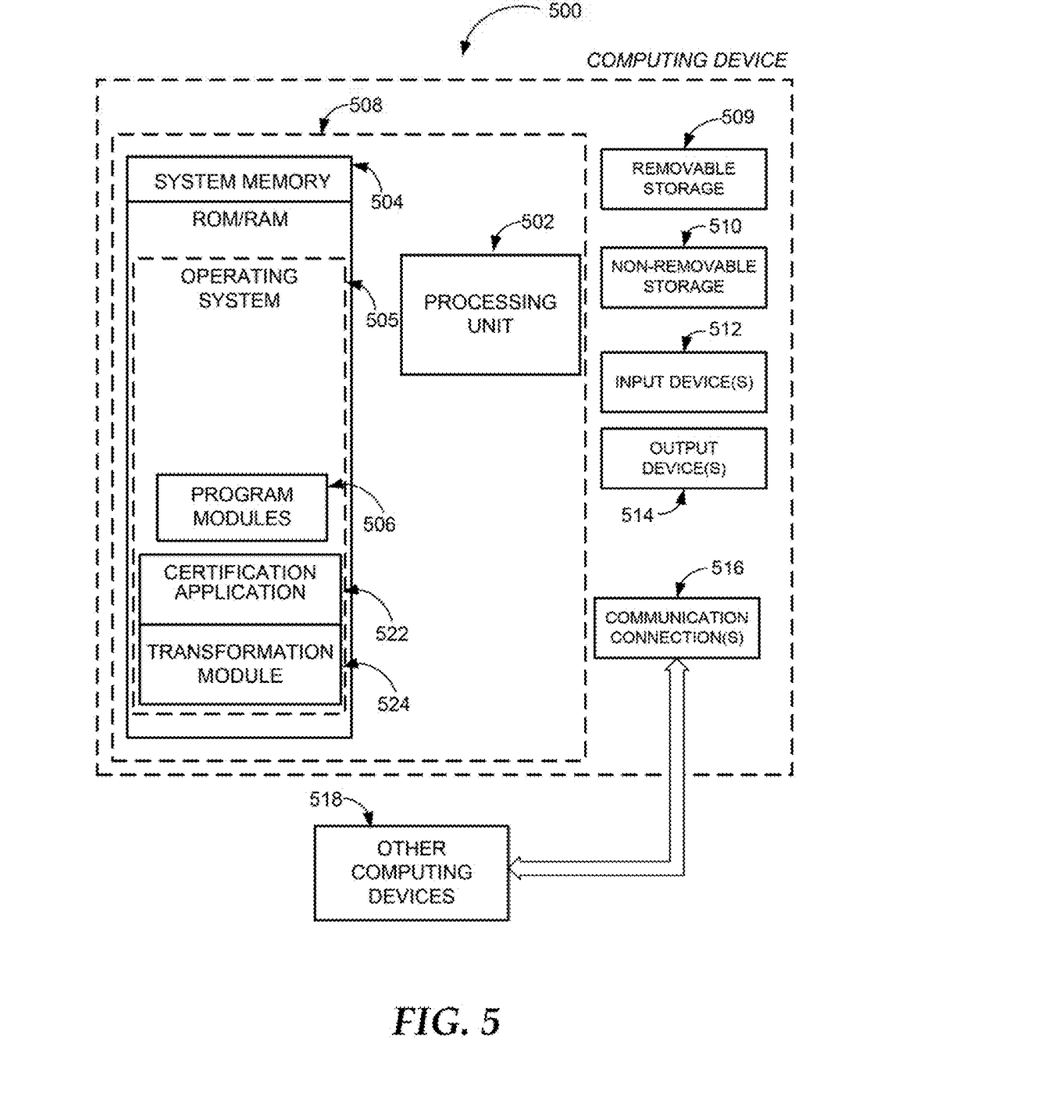
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a certification application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, a certification application 522, and a transformation module 524.

The certification application 522 may automatically generate certification documentation. The certification application 522 may retrieve a component information associated with a service from a data store. The component information may include status information associated with components of the service. The component information ma be transformed for insertion into a certification template by the transformation module 524. The certification template may be selected automatically based on matching attributes between a certification template and the component information. Alternatively, a consumer of the service may provide attributes to the certification application matching a certification template. The transformation module 524 may generate the certification by inserting the component information into the template. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media, Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
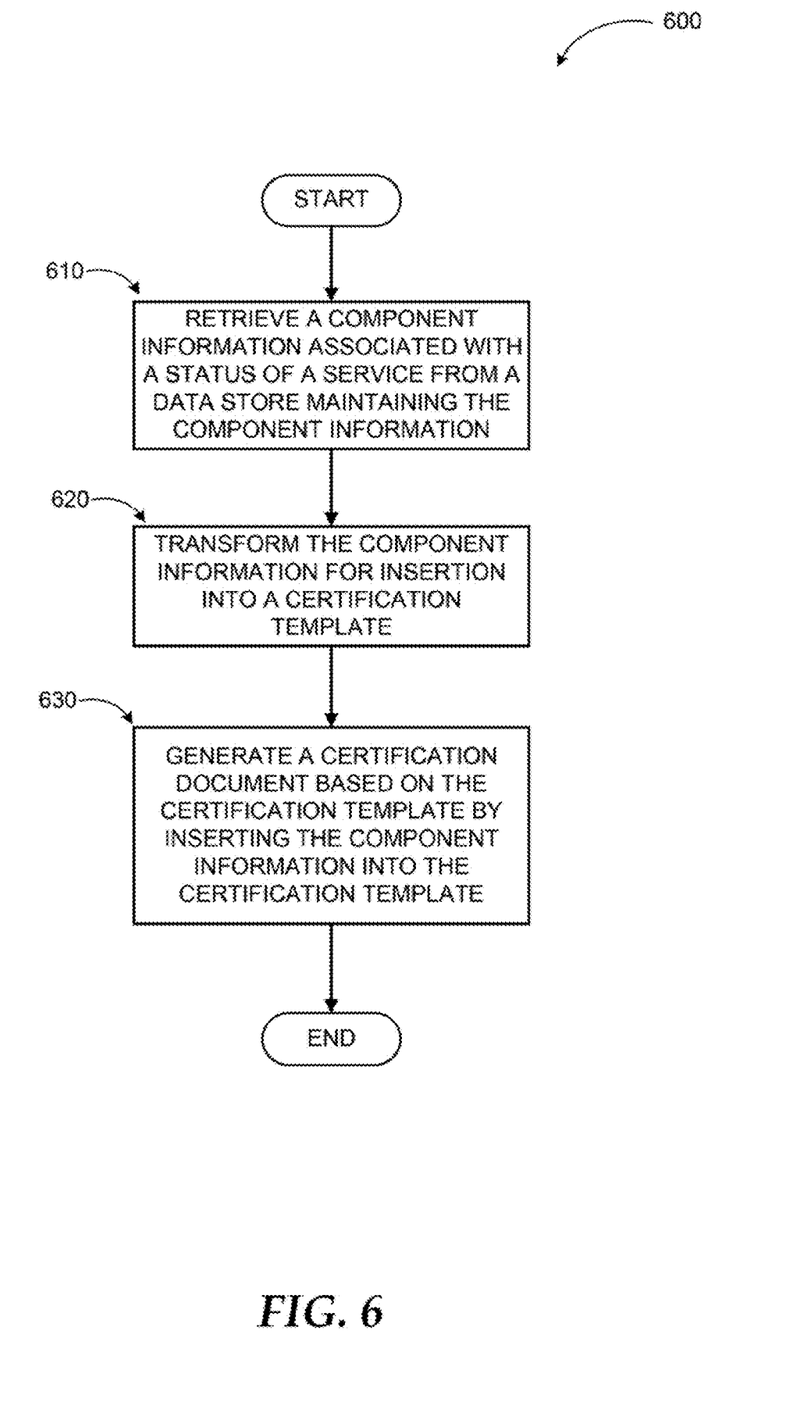
FIG. 6 illustrates a logic flow diagram for a process to generate automatically a certification document according to embodiments.

FIG. 6 illustrates a logic flow diagram for a process to generate automatically a certification document according to embodiments. Process 600 may be implemented on a certification application.

Process 600 begins with operation 610 retrieving a component information associated with a status of a service from a data store maintaining the component information. The component information may be retrieved in response to a consumer request to receive a certification document associated with the service. The component information may be transformed for insertion into a certification template at operation 620. The component information may be processed with risk analysis data, phraseology data, and localization data to transform the component information to match attributes associated with the certification template and/or the consumer. Next, a certification document may be generated based on the certification template by inserting the component information into the certification template at operation 630.

The operations included in process 600 are for illustration purposes. A certification application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A system to automatically generate certification documents, the system comprising:
   a first server configured to execute a service for consumption by a consumer; and
   a second server coupled to the first server through a communication network, the second server configured to execute a certification application to automatically generate a certification document associated with the service, wherein the certification application is configured to:
      detect a request from the consumer to receive the certification document;
      retrieve component information associated with a status of the service from the first server;
      query at least one of the service at the first server and a risk analysis provider to retrieve risk analysis data;
      retrieve phraseology data and localization data from at least one of a local resource and a trusted external resource;
      process the component information with the risk analysis data, the phraseology data, and the localization data to transform the component information for insertion into a certification template;
      generate a certification document based on the certification template by inserting the transformed component information into the certification template; and
   the first server further configured to establish a secure communication channel using the certification document.

2. The system of claim 1, further comprising:
   a data store configured to store component information associated with the service.

3. The system of claim 2, wherein the certification application is further configured to:
   retrieve the component information associated with the status of the service from the data store.

4. The system of claim 2, wherein the component information is updated at the data store in response to at least one change associated with the component information at the service.

5. The system of claim 4, wherein the certification application is further configured to:
   query the service at the first server to retrieve the at least one change associated with the component information based on at least one from a set of: a predetermined schedule, an automatically adjusted schedule, and an event based action;
   update the component information with the at least one change; and
   transmit the updated component information to the data store for storage.

6. The system of claim 2, wherein the certification application is further configured to:
   compare the component information to the risk analysis data;
   update the component information with the risk analysis data in response to determining a discrepancy between the risk analysis data and the component information; and
   transmit the updated component information to the data store.

7. The system of claim 1, wherein the component information comprises component security data that includes implementation information associated with security rules executed by the service.

8. The system of claim 1, wherein the component information comprises component metadata that includes at least one from a set of: a name, a description, an input parameter, and an output parameter associated with the service.

9. The system of claim 1, wherein the certification application is further configured to:
   select the certification template based on at least one matching attribute between the component information and the certification template.

10. The system of claim 1, Wherein the certification application is further configured to:
    transmit the certification document to one of a risk analysis entity and the consumer of the service.

11. The system of claim 1, wherein the secure communication channel comprises a trusted subscription or an encrypted communication.

12. A server implemented on a computing device to automatically generate certification documents, the server comprising:
    a memory device configured to store instructions; and
    one or more hardware processors coupled to the memory device and configured to execute a certification application in conjunction with instructions stored in the memory device, wherein the certification application comprises a transformation module, the transformation module configured to:
       detect a request from a consumer to receive a certification document associated with a service, wherein the service is executed by another server for consumption by the consumer;
       retrieve component information associated with a status of the service from at least one of the other server and a data store configured to store the component information;
       query at least one of the service at the other server and a risk analysis provider to retrieve risk analysis data;
       retrieve phraseology data and localization data from at least one of a local resource and a trusted external resource;
       process the component information with the risk analysis data, the phraseology data, and the localization data to transform the component information for insertion into a certification template;
       generate a certification document based on the certification template by inserting the transformed component information into the certification template; and
       enable the other server to establish a secure communication channel using the certification document.

13. The server of claim 12, wherein the transformation module is further configured to:
    translate the component information to a coherent sentence structure of a language parameter associated with the consumer based on the phraseology data.

14. The server of claim 12, wherein the transformation module is further configured to:
    process the component information to a technical detail to match a technical detail setting of the certification template based on the phraseology data.

15. The server of claim 12, wherein the transformation module is further configured to:
    translate the component information based on the localization data to match a localization setting of the consumer, wherein the localization setting is determined from at least one of: a location of the consumer and a consumer provided setting.

16. The server of claim 12, wherein the secure communication channel comprises a trusted subscription or an encrypted communication.

17. A method to automatically generate certification documents, the method comprising:
- a first server detecting a request from a consumer to receive a certification document associated with a service, wherein the service is executed by a second server for consumption by the consumer;
- the first server retrieving component information associated with a status of the service from at least one of the second server and a data store configured to store the component information;
- the first server querying at least one of the service at the second server and a risk analysis provider to retrieve risk analysis data;
- the first server retrieving phraseology data and localization data from at least one of a local resource and a trusted external resource;
- the first server processing the component information with the risk analysis data, the phraseology data, and the localization data to transform the component information for insertion into a certification template;
- the first server generating a certification document based on the certification template by inserting the transformed component information into the certification template; and
- the first server establishing a secure communication channel using the certification document.

18. The method of claim 17, further comprising:
the first server determining a placement of a content of the component information in the certification document based on the risk analysis data.

19. The method of claim 18, further comprising:
the first server determining a first placement of a first portion of a content of the component information in a body of the certification document based on the risk analysis data; and
the first server determining a second placement of a second portion of the content of the component information in appendices of the certification document.

20. The method of claim 17, wherein the secure communication channel comprises a trusted subscription or an encrypted communication.

* * * * *